(No Model.)

H. R. DEVINE.
WIPER AND OILER FOR PISTON AND BRAKE RODS.

No. 512,166. Patented Jan. 2, 1894.

Witnesses: Henry R. Devine, Inventor

THE NATIONAL LITHOGRAPHING COMPANY,
WASHINGTON, D. C.

UNITED STATES PATENT OFFICE.

HENRY R. DEVINE, OF BOSTON, MASSACHUSETTS.

WIPER AND OILER FOR PISTON AND BRAKE RODS.

SPECIFICATION forming part of Letters Patent No. 512,166, dated January 2, 1894.

Application filed July 1, 1892. Serial No. 438,647. (No model.)

*To all whom it may concern:*

Be it known that I, HENRY R. DEVINE, of Boston, in the county of Suffolk and State of Massachusetts, have invented a new and useful Wiper and Oiler for Piston and Brake Rods, of which the following is a specification, reference being had to the accompanying drawings, in which—

Figure 1:
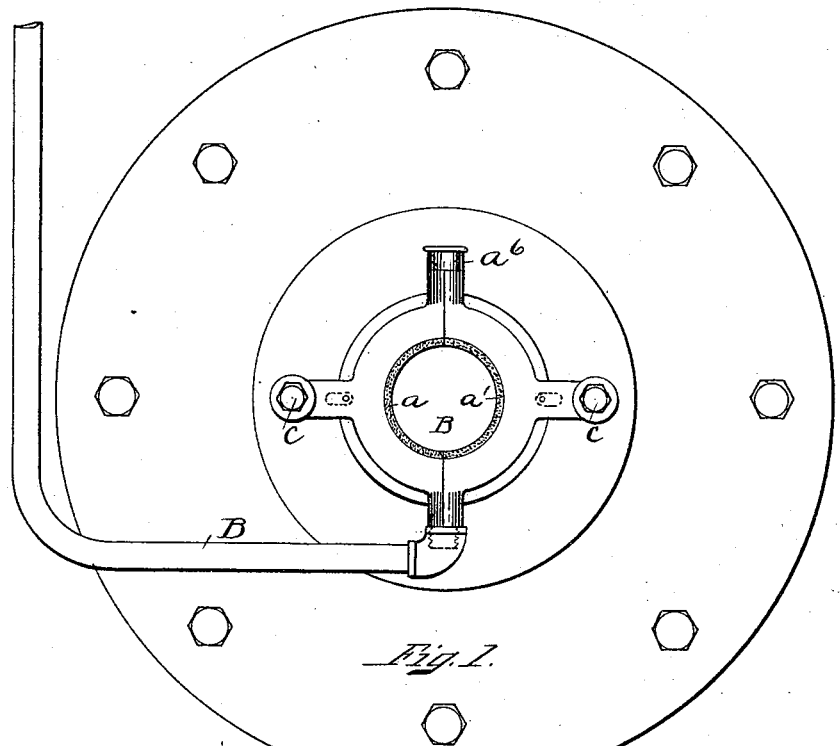
Figures 2, 3, 4, 5, 6:
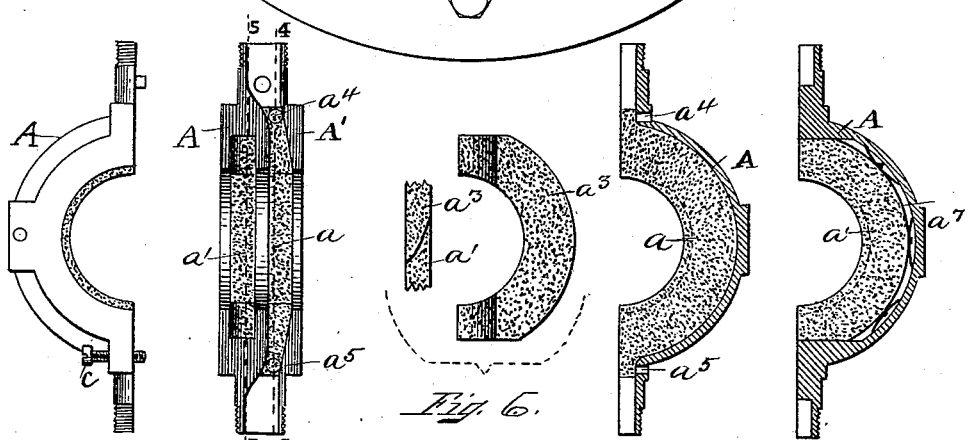
Figures 7, 8:
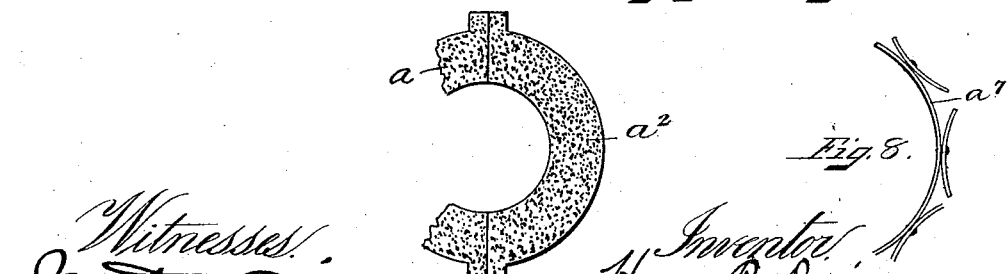

Figure 1 is an end view showing a stuffing box with my invention applied. Figs. 2 and 3 are elevations of the two main parts of my apparatus. Figs. 4 and 5 are sections on the lines 4—4 and 5—5 of Fig. 3. Fig. 6 illustrates the wiper cushions and Fig. 7 the oiler cushions. Fig. 8 illustrates the springs of the wiper cushions.

My invention is a device to be applied to piston rods, valve rods, and the like for the purpose of preventing dirt and dust from getting into the packing of the stuffing box and reducing friction; and consists of a holder in two parts, adapted to be placed about the rod, and held stationary so that the rod reciprocates through it, this holder carrying a wiper and oiler, either or both; for the cushion which serves as a wiper will also serve as an oiler, although it is much better to use two cushions, one serving primarily as a wiper and the other as an oiler; although, of course, the oiler cushion acts somewhat as a wiper, and the wiper cushion acts somewhat as an oiler, when two cushions are used.

The best form of my invention is that shown in the drawings in which A and A' are two half rings, each grooved to receive the cushions $a$ $a'$ $a^2$ $a^3$. One of these two grooves opens to the oil channels $a^4$ $a^5$ as clearly shown in Fig. 3. These oil channels are preferably duplicated, that is, one on each end of the half rings A A' so that either may connect with the oil pipe B; but one of course will answer, and in practice one will usually be closed by the cap $a^6$. The half rings are secured upon the stuffing box by bolts $b$ and are additionally secured by cap $a^6$ and the oil pipe B.

The oiler cushions $a$ $a^2$ are of wicking or felt, and are preferably soft enough to press against the rod B (when the half rings A A' are put in place), without need of springs to force them out of their grooves; but the wiper cushions $a'$ $a^3$ are chamfered off as shown in Fig. 6, and are pressed out by the springs $a^7$, so that they wipe off all grit and dirt, and prevent it from getting into the stuffing box. The springs $a^7$ are half rings of metal backed up by smaller springs; as well shown in Fig. 8, and in place in Fig. 5. Of course the half rings A A' may be made longer to receive spiral or other springs; but the form of spring shown is preferable because it is desirable not to make the half rings A A' clumsy in appearance.

The set screws $c$ serve to choke the oiler cushions $a$ $a^2$ more or less.

When in use the rod is wiped clean by the wiper cushions $a'$ $a^3$, as the rod reciprocates through them, and dirt and grit prevented from getting into the packing of the stuffing box; this materially diminishes wear and friction, and the constant oiling from the oiler cushions $a$ $a^2$ aids in this result, the rod being always clean and well oiled, and therefore reciprocating through the stuffing box with materially less friction and wear than heretofore.

What I claim as my invention is—

1. The device described made up of a cushion holder in two parts A A', each a half ring, and each with a semicircular groove to receive oiler cushions, and a half neck forming hollow studs (when the two half rings are put together about the rod,) by which the two half rings A A' are held together, and connected to the oil pipe; all substantially as described.

2. In combination two half rings A A', each with two sets of grooves; two sets of cushions, $a$ $a^2$ and $a'$ $a^3$, one set in one groove the other set in the other grooves; and half necks on the half rings, which when put together form an oil channel, as $a^4$ or $a^5$, connecting with the grooves containing the oil cushions; but separated by a partition from the grooves containing the wiper cushions; all substantially as described.

3. In combination half rings A A'; each with a semicircular groove; flexible cushions $a'$ $a^3$; springs $a^7$, composed of semicircular strips of steel with their inner faces in contact at all points with the flexible cushions and backing springs connected to the semicircular strips and in contact with the bottom of the grooves, as and for the purposes set forth.

HENRY R. DEVINE.

Witnesses:
JONATHAN CILLEY,
JOHN R. SNOW.